United States Patent Office 3,336,678
Patented Aug. 22, 1967

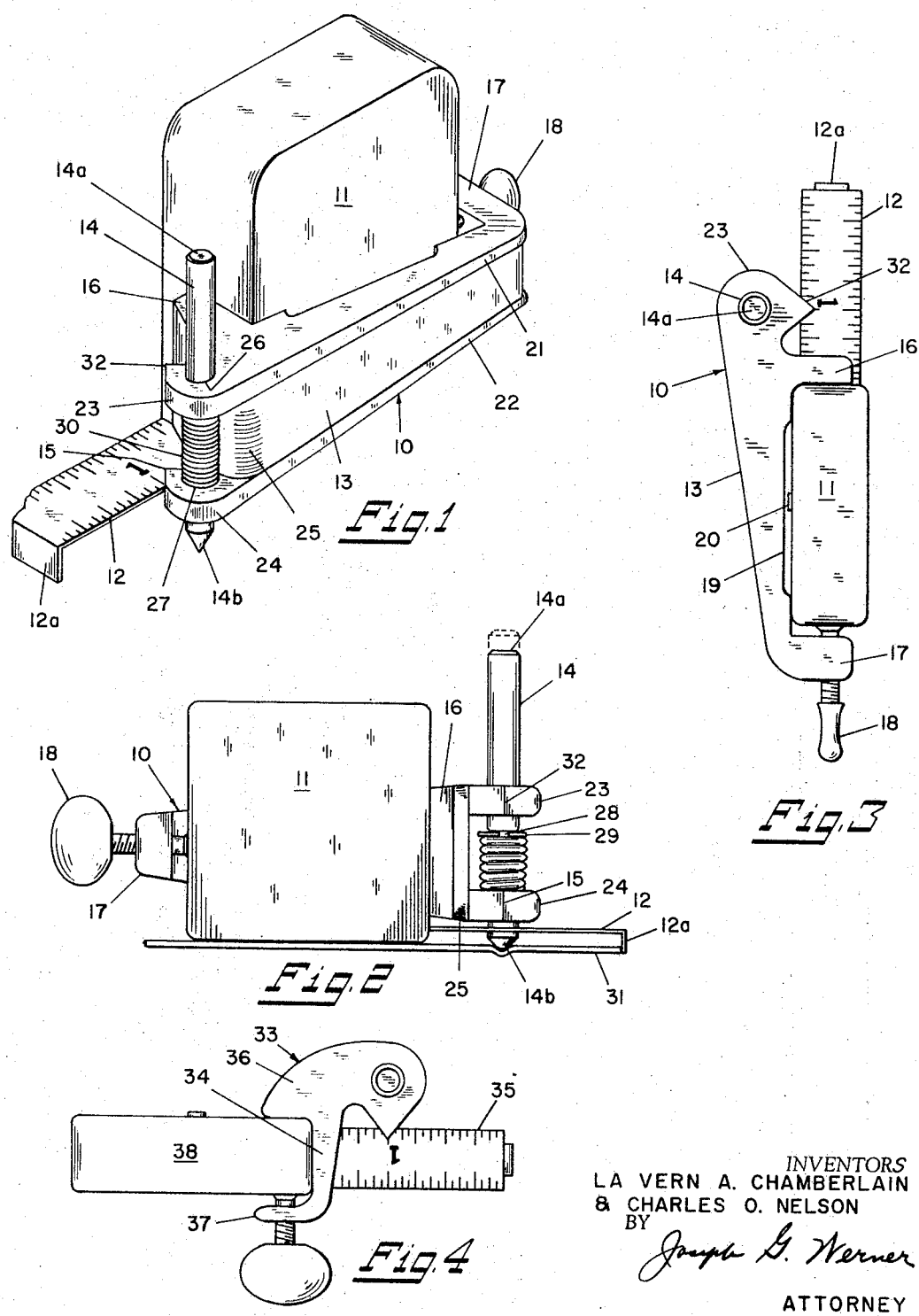
Aug. 22, 1967  LA VERN A. CHAMBERLAIN ET AL  3,336,678
MARKING ATTACHMENT FOR COILED MEASURING TAPE
Filed Aug. 9, 1965
INVENTORS
LA VERN A. CHAMBERLAIN
& CHARLES O. NELSON
BY
Joseph G. Werner
ATTORNEY

3,336,678
MARKING ATTACHMENT FOR COILED
MEASURING TAPE
La Vern A. Chamberlain, 113 E. Franklin St., Rockton, Ill. 61072, and Charles O. Nelson, Box 13, Roscoe, Ill. 61073
Filed Aug. 9, 1965, Ser. No. 478,382
3 Claims. (Cl. 33—189)

ABSTRACT OF THE DISCLOSURE

A marking attachment for use in connection with a coiled measuring tape. The attachment has an elongate rigid body with transversely extending front and rear arms and a thumb screw for attaching the device on a tape casing. A vertically disposed marking element is mounted in forwardly extending upper and lower yoke arms adjacent the edge of the measuring tape. The attachment may be mounted on either side of the tape casing and the marking element may be reversed by removal of a snap ring to facilitate either right or left hand operation and use with graduations on either edge of the tape. A pointer is formed on each of the upper and lower yoke arms in transverse alignment with the marking element for indicating the distance at which the measuring tape extends beyond the marking element. The two pointers permit accurate measuring during either right or left hand operation.

---

This invention relates to measuring and marking devices and more particularly to a marking attachment for use in connection with a conventional extensible measuring tape coiled in a casing.

An object of our invention is to provide a new and improved marking device which can be readily attached to the casing of a conventional coiled measuring tape to facilitate the making of quick and accurate measurements therewith.

Another object of our invention is to provide a new and useful marking device which can be readily attached to measuring tape cases of various sizes and shapes.

Another object of our invention is to provide a marking device having a reversible marking tool to facilitate the use of the device with tapes having measuring indicia on both their top and bottom sides.

Another object of our invention is to provide a marking device comprising a metal punch which may be resiliently mounted on the casing of a conventional coiled measuring tape and which is particularly useful in the working of sheet metal.

Still another object of our invention is to provide a marking device comprising a metal punch which may be mounted on the casing of a conventional coiled measuring tape and which is particularly useful in making sheet metal layouts in that several sheets of relatively light gauge metal may be measured and marked simultaneously.

A further object of our invention is to provide a marking attachment for a measuring tape case in which the marking attachment is of simple and economical construction and which is durable in use.

Other objects, features and advantages of our invention will be apparent from the following detailed description taken in conjunction with the accompanying drawings of two embodiments exemplifying the principles of our invention.

In the drawings:

FIG. 1 is a perspective view of our invention attached to the casing of a conventional coiled measuring tape.

FIG. 2 is a side elevational view of our invention attached to the casing of a conventional coiled measuring tape which is extended over the edge of a workpiece.

FIG. 3 is a top view of our invention attached to the casing of a conventional coiled measuring tape.

FIG. 4 is a top view of a modified form of our invention attached to the casing of a conventional coiled measuring tape.

Referring now more particularly to the drawings wherein like numerals designate like parts throughout the several views, our marking attachment is generally shown at 10 in FIGS. 1–3 in connection with a casing 11 having an extensible steel measuring tape 12 coiled therein in the known manner.

As shown in FIGS. 1–3, attachment 10 generally comprises a body portion 13 which is clamped on casing 11 and has a marking tool 14 mounted for reciprocal movement in its forward end adjacent the edge of measuring tape 12 and positioned in transverse alignment with a pointer 15 extending over tape 12.

As best seen in FIGS. 2 and 3, the elongated body portion 13 has transversely extending forward and rear arms 16 and 17, respectively, adapted to receive casing 11 therebetween. The arms 16 and 17 are spaced somewhat wider apart than the length of casing 11. A thumbscrew 18 is threaded through rear arm 17 and into engagement with the rear wall of casing 11. The attachment 10 is, thus, held securely on casing 11 by front arm 16 and thumb-screw 18. It is readily apparent that attachment 10 can be mounted on any substantially rectangular casing which is of such a size as will fit between transverse arms 16 and 17 and which can be reached by thumb-screw 18 when the screw is turned in as far as it will go.

As best seen in FIG. 3, body portion 13 has a recessed portion 19 for accommodating various protrusions in the side of casing 11, such as for example, pin 20 on which the measuring tape 12 is coiled and which extends outwardly of the sides of casing 11.

Body portion 13 has upper and lower strengthening rigs 21 and 22, respectively, which extend substantially the length of body 13 as shown in FIG. 1. Upper rib 21 terminates in an upper arm 23 and lower rib 22 terminates in a lower arm 24 which together form a yoke 25 at the forward end of body 13.

Yoke arms 23 and 24 have vertically aligned holes 26 and 27 therethrough for slidably receiving a marking tool such as punch 14. Punch 14 is preferably formed of hardened steel and has a peripheral groove 28 in which a conventional retaining clip or snap ring 29 is inserted in the well-known manner for retaining punch 14 in yoke 25.

A helical spring 30 encircles punch 14 between yoke arms 23 and 24 and abuts clip 29 for biasing punch 14 upwardly in yoke 25. Punch 14 is shown in its upper position in phantom in FIG. 2 and in its depressed or marking position in full lines.

As best seen in FIG. 2, when the punch 14 is depressed, by tapping its top end 14a with a hammer (not shown) or the like, the point 14b thereof extends slightly below the bottom of casing 11 so as to indent the workpiece 31 at the measured distance.

Yoke arms 23 and 24 have pointers 32 and 15, respectively, formed thereon so as to overlie a portion of the measuring tape 12 when the tape extends out of casing 11 as shown in FIG. 3. The pointers 15 and 32 are in exact transverse alignment with the center of punch 14.

The body portion 13 of our attachment is preferably made of plastic, but may be made of any substantially rigid suitable material.

In use, our marking attachment 10 is mounted on the casing 11 of a conventional coiled measuring tape by first retracting thumb-screw 18 until the casing 11 can be freely inserted between transverse arms 16 and 17. Screw 18 is then tightened against the rear of casing 11 until the casing is securely held between arm 16 and screw 18.

It will be noted that our marking attachment 10 may be adjusted vertically on casing 11 as desired. However, as best seen in FIG. 2 the lower yoke arm 24 and, thus, pointer 15 should be in close proximity to the upper surface of tape 12 to facilitate the making of very accurate measurements.

The casing 11 with our attachment 10 secured thereon may then be grasped by a workman in one hand in the usual manner. The tip 12a of the measuring tape 12 is then hooked over the edge of the workpiece 31 as shown in FIG. 2 and the tape is then extended by guiding the casing 11 along the surface of the workpiece until the pointer 15 indicates the desired distance on the tape. The workman then strikes a light blow on the top 14a of punch 14 with a hammer or other suitable tool, thus, depressing the punch 14 to make an indentation in the workpiece at the desired distance from the edge. The spring 30 then returns punch 14 to its upper position shown in phantom in FIG. 2.

The depth of indentation may be controlled by the vertical positioning of body 13 on casing 11 and, of course, by the forcefulness of the blow which is delivered to the top of punch 14. While only a single workpiece is shown in FIG. 2, it is apparent that several stacked workpieces may be simultaneously marked with our new marking device.

A modified form of our invention is shown in FIG. 4. In this form the attachment 33 has a body portion 34 which is disposed transversely with respect to the measuring tape 35 and has arms 36 and 37 which are longitudinally disposed for grasping the sides of the casing 38. This embodiment of our invention is particularly useful for attachment to casings which are cylindrical rather than generally rectangular. The marking attachment 33 will accommodate casings of more varied diameter than attachment 10 and its use is limited only by the width of the tape casing.

Attachment 10 and modified attachment 33 may be used in connection with measuring tapes which have indicia on both their top and bottom sides. To use the attachments with the indicia on the bottom side of a tape the snap ring 29 is removed from groove 28, the marking tool 14 reversed and snap ring 29 replaced in groove 28.

It is understood that our invention is not confined to the particular construction and arrangement of parts herein illustrated and described, but embraces all such modified forms thereof as may come within the scope of the following claims.

We claim:
1. A marking attachment for use in connection with an extensible measuring tape coiled in a casing, said attachment comprising:
   (a) a substantially rigid elongate body having transversely extending front and rear arms adapted to receive said case therebetween and a forwardly extending yoke portion having upper and lower arms,
   (b) adjustable screw means extending through said rear arm for securely holding said casing between said arms,
   (c) a vertically disposed marking element mounted in the upper and lower yoke arms at the forward end of said body adjacent the edge of said measuring tape for marking the material being measured, and
   (d) a pointer formed on each of said upper and lower yoke arms, said pointers being disposed in transverse alignment with said marking element for indicating the distance which said measuring tape extends beyond said marking element.

2. A marking attachment for use in connection with an extensible measuring tape coiled in a casing, said attachment comprising:
   (a) a substantially rigid elongate body having transversely extending front and rear arms adapted to receive said casing therebetween and a forwardly extending yoke portion having upper and lower arms,
   (b) adjustable screw means extending through said rear arms for securely holding said casing between said front and rear arms,
   (c) a vertically disposed punch slidably received in a pair of aligned holes in said yoke adjacent the edge of said measuring tape for indenting the material being measured,
   (d) means for retaining said punch in said yoke,
   (e) resilient means biasing said punch upwardly in said yoke, and
   (f) a pointer formed on each of the upper and lower arms of said yoke portion, said pointers being disposed in transverse alignment with said punch for indicating the distance which said measuring tape extends beyond said punch.

3. A marking attachment for use in connection with an extensible measuring tape coiled in a casing, said attachment comprising:
   (a) a substantially rigid elongate body having transversely extending front and rear arms adapted to receive said casing therebetween and a yoke portion having upper and lower arms,
   (b) adjustable screw means extending through said rear arm for securely holding said casing between said front and rear arms,
   (c) a vertically disposed punch slidably received in a pair of aligned holes in said upper and lower yoke arm adjacent the edge of said measuring tape for indenting the material being measured,
   (d) a spring clip removably received in a groove in said punch,
   (e) a helical spring encircling said punch between the upper and lower arms of said yoke portion and abutting said clip for biasing said punch upwardly in said yoke portion, and
   (f) a pointer formed on each of the upper and lower arms of said yoke portion, said pointers being disposed in transverse alignment with said punch for indicating the distance which said measuring tape extends beyond said punch.

References Cited
UNITED STATES PATENTS

| | | | |
|---|---|---|---|
| 888,377 | 5/1908 | Wood. | |
| 1,353,682 | 9/1920 | Viezzi | 33—173 |
| 2,651,843 | 9/1953 | Goodford | 33—27 |
| 2,807,886 | 10/1957 | Aciego | 33—189 |
| 3,063,157 | 11/1962 | Keene | 33—189 |
| 3,100,941 | 8/1963 | Taylor | 33—189 |
| 3,262,211 | 7/1966 | Beckett | 33—189 |

LEONARD FORMAN, *Primary Examiner.*

WILLIAM D. MARTIN, *Examiner.*